Jan. 15, 1952 L. F. KUTIK 2,582,260
APPARATUS FOR MOLDING THERMOPLASTIC MATERIALS
Filed Jan. 19, 1949 4 Sheets-Sheet 1

INVENTOR.
LOUIS F. KUTIK.
BY Ward, Crosby & Neal
ATTORNEYS.

Jan. 15, 1952          L. F. KUTIK          2,582,260
APPARATUS FOR MOLDING THERMOPLASTIC MATERIALS
Filed Jan. 19, 1949          4 Sheets-Sheet 2
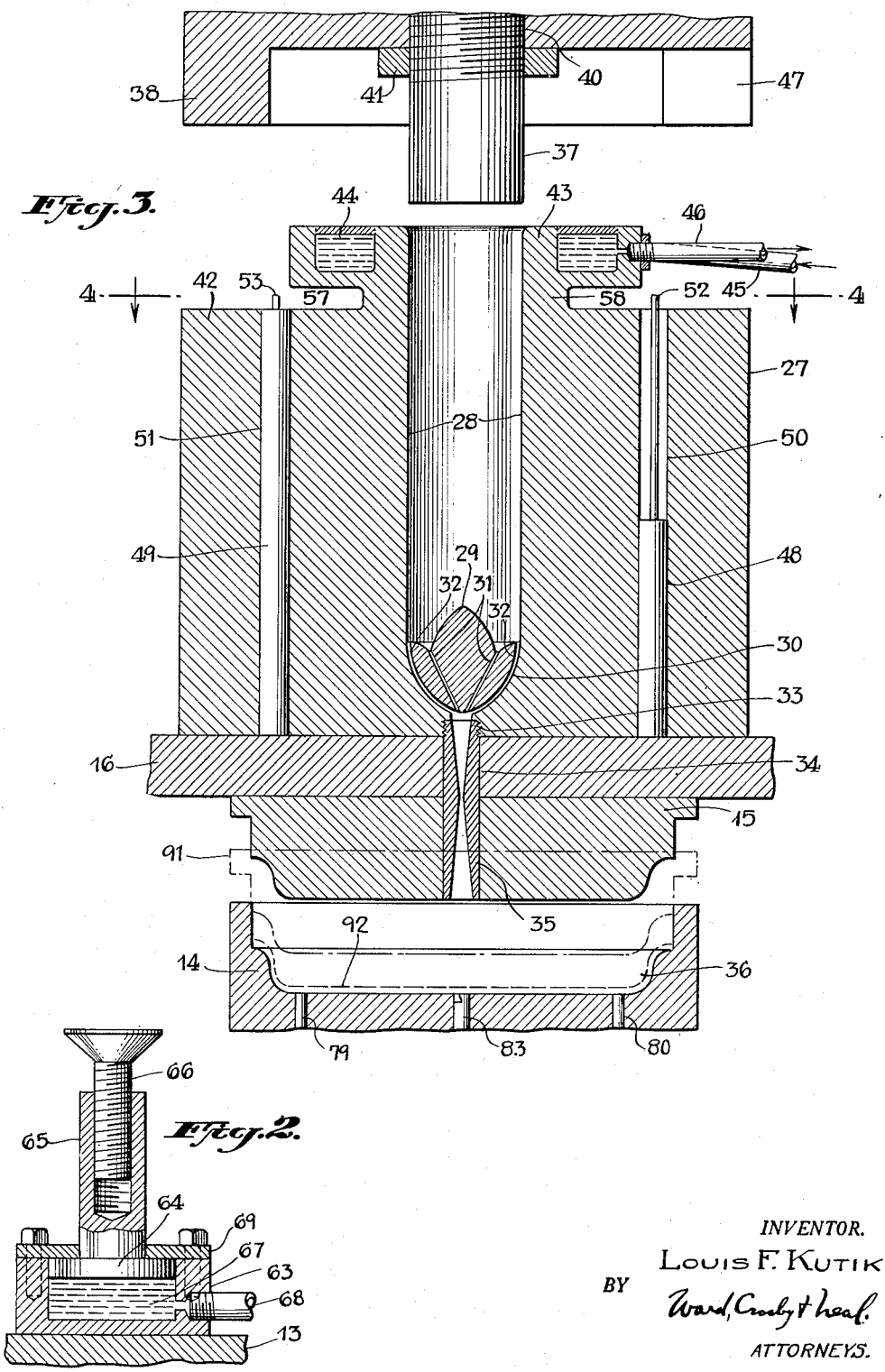
INVENTOR.
LOUIS F. KUTIK.
BY
ATTORNEYS.

Jan. 15, 1952     L. F. KUTIK     2,582,260
APPARATUS FOR MOLDING THERMOPLASTIC MATERIALS
Filed Jan. 19, 1949     4 Sheets-Sheet 3
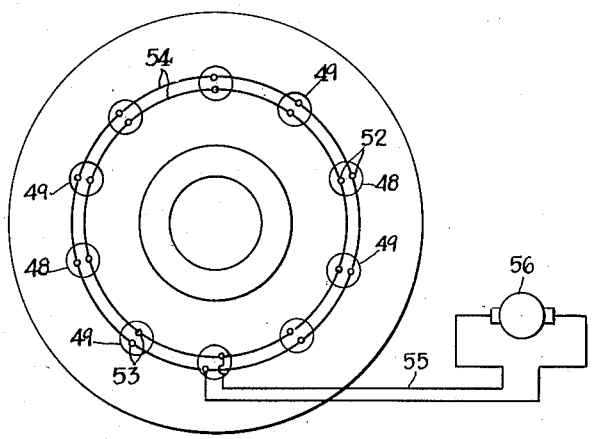
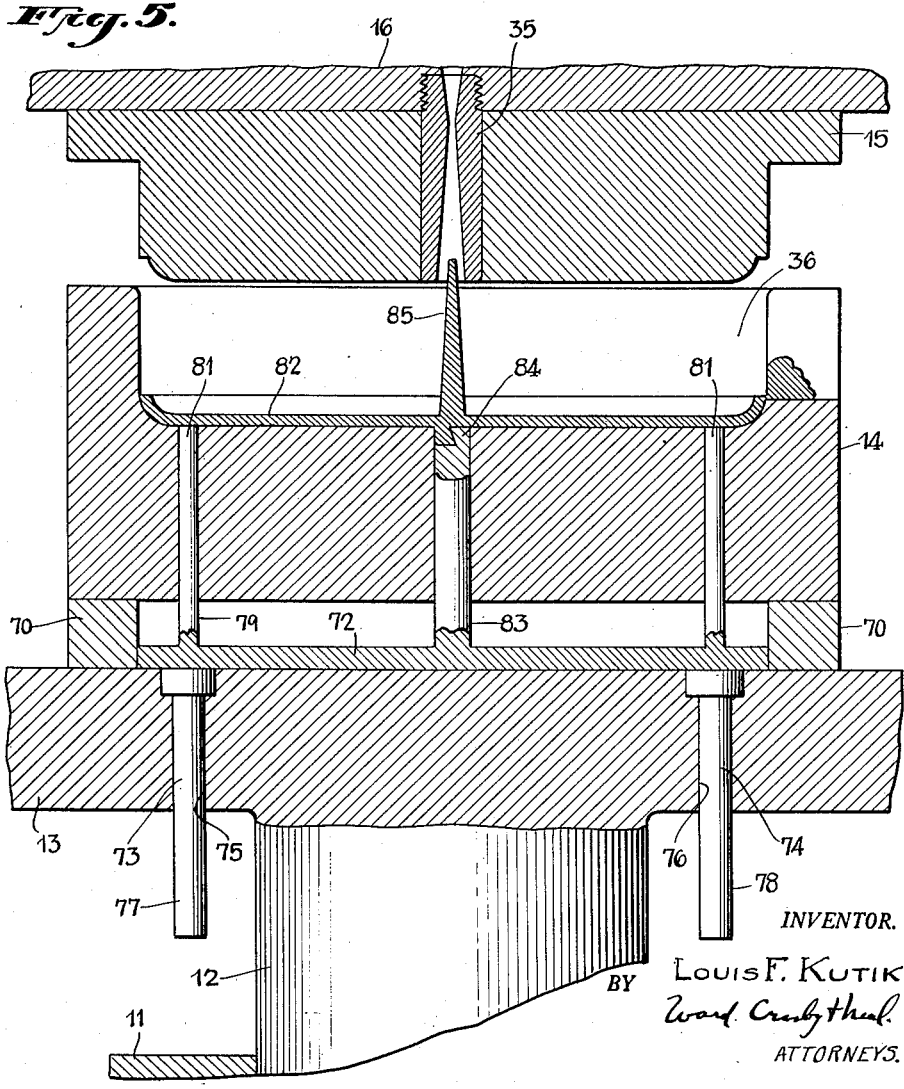
INVENTOR.
LOUIS F. KUTIK.
ATTORNEYS.

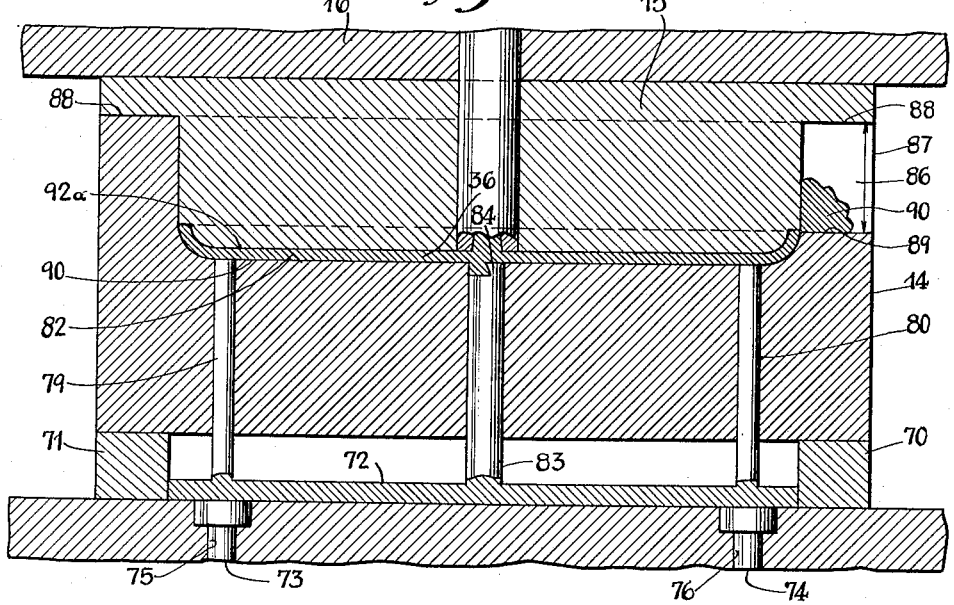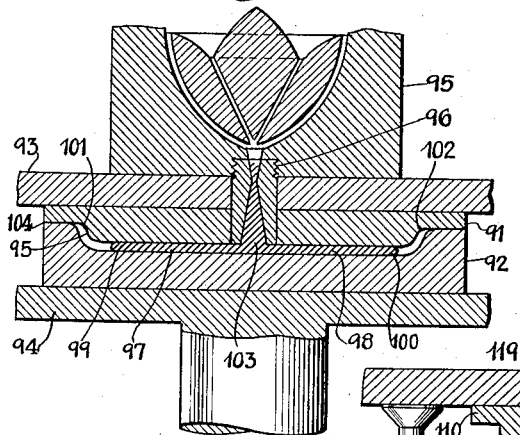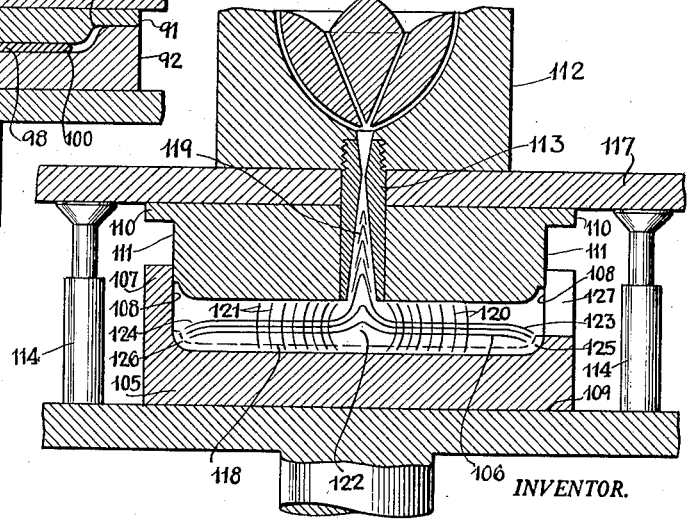

Patented Jan. 15, 1952

2,582,260

UNITED STATES PATENT OFFICE 2,582,260

APPARATUS FOR MOLDING THERMO-PLASTIC MATERIALS

Louis F. Kutik, East Paterson, N. J., assignor to St. Regis Paper Company, New York, N. Y., a corporation of New York Application January 19, 1949, Serial No. 71,597

4 Claims. (Cl. 18—30)

This invention pertains to improvements in apparatus for the injection molding of thermally plasticizable materials, such, for example, as thermally plasticizable, synthetic resins, and particularly thermoplastic resins.

It has heretofore been proposed to mold materials of this character by clamping together under extremely high pressure, the two halves of a mold, one of which contains an injection orifice, and thereupon injecting into the orifice the plasticized material, until the mold cavity is completely filled, the material thereupon being allowed to cool and harden, the mold thereupon opened, and the so-molded article removed therefrom. This method of injection molding has the disadvantages that an extremely high clamping pressure, of the order of 6,000 pounds per square inch, is required to hold the two halves of the mold together, while the plasticized material is injected therein, and also an extremely high pressure, of the order of 16,000 to 20,000 p. s. i., is required to inject the plasticized material into the mold. The high injection pressure is required in order to force the plasticized material into the relatively narrow space between the upper and lower mold halves and thence throughout the relatively large area of the mold cavity. This effect is especially pronounced where articles are to be molded in the form of relatively thin and wide sheets, panels, or the like. The high clamping pressure is required in order to prevent the material injected into the mold from being extruded outwardly through the junction between the two halves thereof, in the form of a "flash," in consequence of the high injection pressure required to force the plasticized material into all extremities of the mold cavity for completely filling the same.

In accordance with the present invention, I propose to overcome these disadvantages of previously known injection procedures, by means of an improved apparatus, employing a mold of the so-called "positive type" comprising a lower half or "chase" having relatively high side walls, and an upper half or force plug adapted to enter the mold cavity of the chase, in piston-like fashion. The force plug contains an axially extending injection nozzle or orifice for injecting the plasticized material into the mold.

According to a basic principle of the invention, the molding procedure is carried out in such manner that the force plug is initially inserted into the chase to only a relatively slight extent, forming thereby a relatively large mold cavity between the chase and force plug, a considerably larger cavity than is required for molding the finished article to the required thickness. The plasticized material is thereupon injected into the mold through the injection nozzle, in an amount sufficient to mold the finished article. In this instance, however, relatively little pressure is required for injecting the charge of plasticized material into the mold cavity, owing to the fact that at this stage of the molding cycle, the cavity is of considerably greater height or thickness than that of the article to be molded, whereby the charge flows freely into the mold cavity. Also since, at this stage of the molding cycle, the charge of plasticized material injected into the cavity, occupies considerably less volume than that of the cavity, very little pressure is exerted between the mold halves so that only a relatively small clamping pressure is required. When the charge has thus been completely injected, the force plug is forced into the mold to the full extent permitted by the interposed charge of plasticized material, thereby to mold the same to the precise configuration of the opposed surfaces of the chase and force plug. The force plug is maintained in this position until the plasticized material has cooled and hardened, and is thereupon withdrawn, and the molded article removed from the chase. In effecting molding by this procedure, injection pressures of only about 3,000 pounds per square inch, and clamping pressures of only about 2,000 pounds per square inch, are required, as compared to the aforesaid injection pressures of about 16,000 to 20,000 p. s. i. and clamping pressures of about 6,000 p. s. i., required with conventional molding procedures as above noted.

In the molding of relatively thin and wide sheets or panels and the like, the molding procedure in accordance with the present invention is preferably carried out with the mold chase mounted with the base of the cavity in the horizontal position, the force plug being vertically displaceable with respect thereto. As before the force plug is initially lowered into the chase cavity to only a slight extent, and the charge of plasticized material thereupon injected into the mold cavity as previously explained. In this instance, however, the charge not only flows freely into the cavity, owing to the elevated position of the force plug in relation to its final molding position, but in addition the charge is forced, under relatively little injection pressure to all lateral extremities of the mold, in such manner as explained below, as to prevent any substantial chilling and congealing of the portions of the charge which flow to the lateral extremities of the mold. Accordingly, when the plunger is depressed to the full extent required for molding the finished article, the entire charge is easily formed, under relatively little pressure into the precise configuration of the opposed surfaces of the chase and force plug, to provide a molded article substantially free from internal strains and having smoothly formed surfaces, entirely free from imperfections, such as striations, seams and the like, frequently observed in articles molded by the conventional procedure above described.

As a refinement of the basic molding procedure, in accordance with the invention above described, the side walls of the chase are provided with one or more slots which extend from the upper edge downwardly to a height corresponding substantially to the thickness of the article to be molded. Again, as previously described, the force plug is initially inserted only to a slight depth into the chase, and thereupon a charge of plasticized material, in excess of that required to mold the finished article, is injected into the mold. The force plug is thereupon depressed to the full depth permitted by the interposed plasticized material, during which operation the excess material is extruded through the chase sidewall slots referred to, whereby, when the force plug is depressed to a depth corresponding to the base of these slots, the residual plasticized material will be molded to the precise thickness and configuration of the molded article desired.

A novel apparatus which I have devised for effecting the injection molding of thermoplastic materials in accordance with the basic procedure above outlined, is constructed in accordance with a preferred embodiment as follows. The apparatus employs a press, preferably of a hydraulic type, including a power-actuated and elevatable ram, a ram platen integral therewith, and a stationary presshead spaced therefrom and mounted thereabove. A bolster plate is displaceably supported from the presshead, as, for example, by means of depending tie rods passing through apertures in the bolster plate and presshead, and terminating in nuts or lugs for normally suspending the bolster plate at a preselected elevation. The bolster plate is preferably resiliently maintained in this position by means of helical compression springs extending about the tie rods. The mold chase is mounted on the ram platen, while the force plug therefor is mounted upon and supported from the under side of the bolster plate. Injection means including a plasticizing chamber is mounted upon the bolster plate, while an injection plunger therefor is secured to and supported by the presshead. Also mounted upon and spaced about the periphery of the ram platen, are a series of force-resisting elements, which preferably take the form of relatively small, auxiliary hydraulic rams, each including an hydraulic cylinder and a piston displaceable therein, the pistons being adapted to engage the bolster plate, and the cylinders being supplied with fluid under a preselected hydraulic pressure, for normally maintaining the pistons in their elevated positions. The bolster plate is normally so positioned or suspended as to maintain the ram pistons spaced therefrom, and also to maintain the force plug spaced from the chase and the injection plunger spaced from the plasticizing chamber.

The operation of the apparatus is such that when the main press ram is elevated, carrying with it the ram platen, the chase supported thereon is elevated toward the force plug until the latter slightly enters the chase. At this elevation the pistons of the auxiliary rams engage the bolster plate, whereupon further elevation of the ram platen elevates the bolster plate concurrently therewith, thereby to prevent further entry of the force plug into the chase. Further elevation of the main press ram causes the injection plunger to enter the plasticizing chamber to inject a charge of the plasticized material into the mold cavity formed between the force plug and chase. As the press ram is still further elevated, the upper surface of the plasticizing chamber ultimately engages a bearing ring carried by the presshead, thereby to arrest further elevation of the plasticizing chamber. As the press ram now tends to elevate still further, sufficient pressure is exerted by the bolster plate on the auxiliary pistons to counterbalance the hydraulic pressure maintaining the pistons in their elevated positions, whereby the ram pistons are depressed against the action of the hydraulic pressure applied thereto, thus permitting the force plug to enter the mold chase to the full depth permitted by the interposed plasticized material, thus molding this material to the precise configuration of the opposed surfaces of the force plug and chase.

Following the molding operation, the main press ram is lowered, whereby the bolster plate is returned to its initial position by gravity assisted by the restoring action of the compression springs surrounding the tie rods, thereby returning the plasticizing chamber to its initial position whereby the injection plug is withdrawn therefrom.

Further lowering of the main press ram, by lowering the main ram platen in relation to the now stationary bolster plate, takes the load off the auxiliary ram pistons, whereby they are automatically reset by the hydraulic pressure continuously applied to the auxiliary ram cylinders. This further lowering of the ram platen, on which the mold chase is mounted, separates the mold chase from the force plug, thus exposing the molded article therein. The mold chase is provided with a kickout mechanism which is actuated when the press platen reaches its lowermost position, to eject the molded article from the chase.

Having thus described the invention in general terms, reference will now be had, for a more detailed description thereof, to the accompanying drawings wherein:

Fig. 2 is an enlarged view in axial sectional elevation of one of the above mentioned auxiliary hydraulic rams shown more or less schematically in the Fig. 1 embodiment;

Fig. 3 is an enlarged axial sectional elevation of the portion of the Fig. 1 showing which includes the injection plunger and plasticizing chamber, bolster plate and mold, for illustrating more clearly the details thereof; while Fig. 4 is a top plan view of the plasticizing chamber as taken at 4—4 of Fig. 3;

Fig. 5 is an enlarged view in axial sectional elevation of the portion of the Fig. 1 embodiment which includes the mold assembly and the knockout pin structure beneath the same for dislodging the molded article, this view illustrating the construction and operation of the knockout assembly more in detail than shown in the Fig. 1 embodiment;

Fig. 6 is an enlarged view in axial sectional elevation, of the mold assembly, illustrative of the constructional details of the mold chase for extrusion of excess plastic material during the molding operation.

Figure 1:
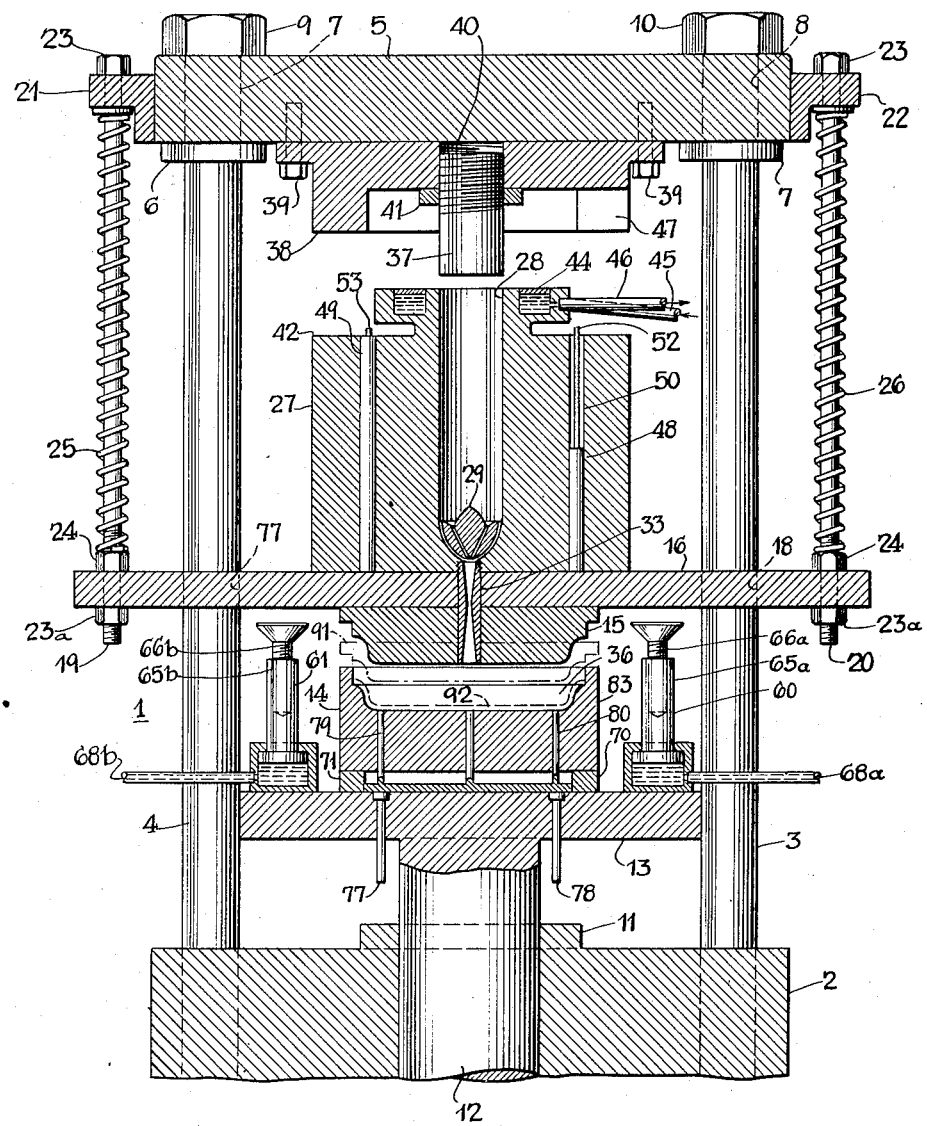
Fig. 1 is a view in axial sectional elevation of an hydraulic press-actuated molding apparatus in accordance with a preferred embodiment of the invention.

Fig. 7 is a schematic view, in axial sectional elevation, of a conventional molding apparatus and procedure illustrative of the manner in which the extruded plastic material flows in the mold cavity; while Fig. 8 is a similar view of a molding apparatus and procedure in accordance with the present invention, and illustrative of the different manner in which the extruded material flows in the mold cavity.

Referring now to the drawings, and more particularly for the moment, to Fig. 1, the molding apparatus thereof comprises, in its essentials, an hydraulic press shown generally at 1, and including a press base 2 in which are securely mounted, spaced uprights, as at 3, 4, on top of which is mounted a press head 5, supported on flanges 6, 7 of the uprights, which latter pass through apertures as at 7, 8 of the press head, the latter being secured in position by means of nuts 9, 10 threaded onto the projecting upper ends of the uprights. Within the uprights is disposed the main ram cylinder 11, in which is slidably positioned the ram 12, actuated by hydraulic pressure in conventional manner. Mounted upon and secured to the ram 12, is a ram platen 13. Mounted upon and secured to the ram platen 13, is the lower half or "chase" 14 of the injection mold, the upper half or "force plug" of which is shown at 15. The force plug 15 is secured to the underside of a heavy bolster plate 16, the latter being drilled, as at 17, 18, for slidable displacement along the uprights 3, 4. The bolster plate 16 is normally carried by tie rods 19, 20, which latter are supported from projecting lugs 21, 22 of the press head 5. To this end the bolster plate 16 and press head lugs 21, 22, are drilled for reception of the tie rods, the latter being slidably secured in place thereto by means of nuts 23 threaded onto the upper ends thereof, other nuts 24 and 25 being threaded onto the opposite ends of the tie rods, on opposite sides respectively of the bolster plate 16, for normally supporting the bolster plate in the position shown in Fig. 1. As stated, the tie rods are slidably displaceable with respect to lugs 21, 22, while the bolster plate is slidably displaceable along the press uprights 3, 4, but for normally maintaining the bolster plate in the position shown in Fig. 1, and to facilitate returning it to this position following a molding operation, as explained hereinafter, the tie rods extend through helical compression springs, as at 26.

Mounted upon and secured to the bolster plate 16, is a plasticizing chamber or cylinder 27, having a cylindrical cavity 28 formed therein for reception of the material to be plasticized. Referring for the moment to Fig. 3, in conjunction with Fig. 1, the cavity 28, terminates at its lower end in a so-called "torpedo" 29, the latter comprising a metal insert of the configuration shown, which is insertable in the cavity 28 and rests and fits against the lower, approximately conically shaped, and curved wall portion 30 of the plasticizing chamber cavity 28. The torpedo has formed therein a series of passageways as at 31 and peripherally spaced grooves as at 32, which interconnect the chamber cavity 28 with an injection nozzle and sprue bushing 33 which is tapped to the base of the plasticizing chamber, and extends through axially drilled holes in the bolster plate 16 and force plug 15, as shown, for injecting the plasticized material from the plasticizing chamber cavity 28 into the mold cavity 36. It will be noted that member 33 is of Venturi tube configuration in axial section, the upper, inwardly tapering portion comprising the injection nozzle, while the lower, outwardly tapering portion comprises the sprue bushing.

Still referring to Figs. 1 and 3, the plasticizing chamber 27, has cooperating therewith an injection plunger 37, so mounted as to enter and slidably engage the cylindrical walls of the chamber cavity 28 for injecting the plasticized material, under pressure, through the passageways and grooves 30, 31 of the torpedo 29 and thence through the injection nozzle and sprue plug 33 into the mold cavity 36. To this end the plunger 37 is threaded, in axial alinement with the chamber cavity 28, to a bearing ring 38, which in turn is secured to the press head 5, by means of threaded bolts 39. The bearing ring 38 is appropriately drilled and tapped as at 40 for reception of plunger 37, this threaded connection being provided for adjusting the elevation of the plunger in relation to the plasticizing chamber 27, for purposes explained hereinafter. A locking nut 41 is threaded onto the plunger 37 for locking the same in any desired elevation as aforesaid. The function of the bearing ring 38 is to engage the upper and outer peripheral surface 42 of the plasticizing chamber, during the pressing operation, thereby to limit the extent of entry of the injection plunger 37 into the chamber cavity 28, while at the same time providing the necessary pressing force for effecting the molding operation as explained hereinafter.

As shown more particularly in Fig. 3, the upper portion of the plasticizing chamber 27 terminates, adjacent the inner walls of the chamber cavity 28, in a flanged shoulder 43, having a peripherally extending water core or conduit 44 formed therein, supplied with cooling fluid such as cold water, from inlet and outlet pipes 45, 46. In order to prevent these inlet and outlet pipes 45, 46, from interfering with engagement of the bearing ring 38 against the outer peripheral portion 42 of the plasticizing chamber during operation of the apparatus, the bearing ring is provided with an axially extending cutout portion 47, adapted to span these inlet and outlet connections 45, 46. The purpose of water cooling the upper portion of the plasticizing chamber in this matter is to prevent heating and thereby plasticizing the resin or other plasticizable material, as it is charged into the chamber cavity 28; and also to minimize thermal expansion of the upper wall of the chamber cavity, such as would tend to permit the plasticized material to be extruded in the clearance that would otherwise be formed between the injection plunger 37 and the cylindrical cavity 28, due to heating of the lower portion of the plasticizing chamber as explained below.

For plasticizing the resin or other plasticizable material charged into the chamber cavity 28, the chamber is preferably heated by means of electrical cartridge heaters, such as 48, 49, Figs. 1 and 3, insertable in holes such as 50, 51 extending longitudinally through the wall of chamber 27, and spaced peripherally thereabout as shown in Fig. 4. Since it is desired to supply more heat to the lower portion of the chamber 27 than to the upper portion, certain of the cartridge heaters, such as 48, extend only partially of the height of chamber 27, while other heaters such as 49 extend the entire height thereof, the short cartridge heaters being spaced between the taller cartridge heaters in the manner illustrated at 48, 49 in Fig. 4. The heater elements such as 48, 49 are preferably disposed as close to the chamber cavity 28 as possible in order to assure that the cavity will have substantially the same temperature as the heater elements, at all times. If the heater elements were disposed about the outer surface of the chamber wall, a substantial temperature gradient would occur between the outer wall thereof and the inner chamber cavity wall, which would result in underheating or overheating of the material to be plasticized, so that accurate temperature control of the chamber cavity could not be achieved. Another advantage of the arrangement shown is that sufficient metal is provided in the outer wall portion of the chamber 27, for the bearing ring 38 to bear upon, as at 42, and thereby exert the pressure required when the mold is closed in the molding position, i. e., the full pressure of the press. As shown in Fig. 4, the terminals such as 52, 53 of the cartridge heaters 48, 49, are connected in multiple with each other respectively, as by means of conductors 54, and thence over leads 55 to a suitable source of power supply such as a generator 56. Referring to Fig. 3, the water cooled shoulder 43 of the plasticizing chamber, is undercut, as at 57, in order to provide a relatively thin-walled structure as at 58, thus to minimize thermal conduction between the water cooled entrance portion 43 to the cavity 28 and the lower or heated portion thereof.

Reverting to Fig. 1, mounted upon and spaced about the outer periphery of the ram platen 13, is a series of auxiliary hydraulic rams, as at 60, 61, an axial sectional detail of each of which is shown in Fig. 2. Referring to Fig. 2, each hydraulic ram comprises an hydraulic cylinder 63, in which is slidably displaceable a piston 64, having an upstanding sleeve-like member 65 integral therewith, and into which is threaded a stud 66. The cavity 67 between the cylinder wall and piston, is supplied with hydraulic pressure over a pressure line 68, for normally maintaining the piston or ram head 64, against the upper or stop plate 69 of the cylinder. The stud 66 is threaded into the sleeve member 65 of the piston, for adjusting the height of the stud in relation to the bolster plate 16 as shown in Fig. 1, by studs 66a and 66b, for purposes explained hereinafter.

Referring to Figs. 1 and 5, the mold chase 14 is spaced from the ram platen 13, by means of an interposed supporting ring 70, within which is mounted a pinplate 72, which normally rests on the ram platen 13 as shown, but which is adapted to be engaged and elevated by knockout bars 73, 74, vertically displaceable in bores 75, 76 of the ram platen 13, and normally projecting below the same as at 77 and 78, for engagement by the ram cylinder 11, when the ram platen is lowered sufficiently. When this occurs the knockout bars 77, 78 ride up carrying with them the pinplate 72. The pinplate in turn has secured to its upper surface, upstanding knockout pins as at 79, 80, which are displaceable in bores 81, of the mold chase 14, thus to knock a molded article, such as 82, Fig. 5, out of the chase. There is also secured to the pinplate 72, an upstanding pin 83, provided with a keyway or dovetail as at 84, the function of which is to hold the molded article 82 against the chase 14, as the main ram platen 13 is lowered, following a molding operation, thus to pull a plastic sprue 85, away from the sprue plug portion 35 of member 33, in this way to separate the molded article from the reservoir of plastic material supplied from the plasticizing chamber 28 through the injection nozzle portion 34 of member 33.

Referring to Fig. 6, in order to assure that the molded article will be of precise thickness desired, the mold chase 14 is preferably provided with one or more slots, extending transversely through the side walls thereof, as at 86, from the inner mold cavity 36, to the exterior of the chase as at 87, these slots extending downwardly from the upper surface 88 of the chase to a height 89 corresponding to the upper surface of the molded article 82, to permit extrusion therethrough of excess plastic material, as at 90, thereby to assure that the molded article 82 will have the precise thickness desired.

The operation of the apparatus is as follows: At the start of the molding operation the apparatus is in the position shown in Fig. 1, the plasticizing chamber cavity 28 being filled with a plasticizable material, such as a thermoplastic resin. This material is charged in granular form into the top of cavity 28, and heated to plasticity in the lower portion of the cavity in the manner above described, before a molding cycle is initiated. As the main ram 12 is now elevated, the studs 66a, 66b of the hydraulic rams 60, 61, will engage the underside of the bolster plate 16. These studs are so adjusted in elevation by virtue of their threaded engagement with the piston sleeves 65a, 65b, that when the studs 66a, 66b engage the bolster plate 16, the force plug 15 has slightly entered the opening in the chase 14, to the extent indicated by the dotted lines 91 in Figs. 1 and 3. As the main ram platen 13 is further elevated by ram 12, the hydraulic rams 60, 61 upon engaging the bolster plate 16, proceed to elevate the latter against the compressive action of springs 25, 26, the hydraulic pressure exerted on the rams 60, 61 over the supply lines 68a, 68b, being sufficient to maintain in each instance the ram piston 64, Fig. 2, against the upper stop plate 69. As a result of this action the force plug 15 remains in the relative position in relation to the chase 14 indicated by the dotted lines 91 in Figs. 1 and 3. That is to say, during this stage of the operating cycle, the operation is such as to permit only slight entry of the force plug 15 into the chase 14, and to the extent illustrated, thereby to provide a relatively large mold cavity 36 for injection therein of the plasticized material. As the ram platen 13 is now elevated further, the injection plunger 37 begins to enter the cavity 28 of the plasticizing chamber 27, thus to force the plasticized resin or other plasticized material through the passageways 30, 31 of the torpedo 29 and thence through the injection nozzle and sprue plug member 33, into the mold cavity 36, of the now semi-closed mold 91, 15.

As the ram 12 and ram platen 13 continue to elevate, the upper surface 42 of the plasticizing chamber 27, engages the bearing ring 38 secured to the press head 5, and as the ram platen tends to elevate still further, the hydraulic rams 60, 61 are subjected to the progressively increasing pressure between the bolster plate 16 and the main ram platen 13, until sufficient pressure is developed thereon to more than counterbalance the hydraulic pressure applied to rams 60, 61 over the pressure supply lines 68a, 68b, whereupon the ram pistons are forced down into their respective cylinders, thus permitting the force plug 15 of the mold to enter the chase 14 to the full depth thereof required for the molding operation, i. e., to the depth indicated by the dotted lines 92 of Figs. 1 and 3. The mold comprising the force plug 15 and chase 14 are maintained relatively cool during the molding operation, thereby to provide chill-molding of the molded article, thus to dissipate the heat of the entering plasticized resin and to solidify the same, to mold the finished article in the manner illustrated at 82 of Fig. 6a.

As the force plug 15 is forced into the chase 14 to the position shown in Fig. 6a, the excess of plastic material will be extruded through the slot or slots 86 in the manner shown at 90. When, however, the force plug reaches the position shown in Fig. 6a in relation to the chase, the mold cavity will be sealed along the slot 86 opening, to mold the finished article 82 to the precise dimensions desired. The charge thus injected into the mold is preferably somewhat in excess of that required to mold the finished article in order to assure that the mold cavity 36 will be completely filled with the plasticized material when the mold is closed.

After the article has been molded in the manner above described, the main ram 12 and associated ram platen 13, are withdrawn until the force plug 15 clears the chase 14, in the manner illustrated in Fig. 1. This clearing of the force plug from the chase, is accomplished by means of the tie rods 19, 20, which limit the extent to which the bolster plate 16, under the action of gravity and the restoring action of the compression springs 25, 26, may follow the descending ram platen 13 and mold chase 14 integral therewith. As the main ram platen 13 is lowered, the compression springs 25, 26, cause the bolster plate 16 to follow the descent of the ram platen, until the nuts 23 threaded onto the upper end of the tie rods, engage the press head lugs 21, 22, whereupon further downward movement of the bolster plate and the force plug 15 integral therewith, is arrested. While this action is transpiring, the hydraulic pressure continuously applied to the rams 60, 61 over the supply lines 67, resets the studs 65 thereof to their initial positions of Fig. 1. As the force plug is thus withdrawn from the chase, the keyway 84 of pin 83, Fig. 5, holds the molded article 82 against the chase and at the same time separates the plastic material in the form of the sprue 85, from the sprue plug portion 35, of member 33.

As the ram platen 15 descends further, the lower ends of the knockout bars 77, 78, engage the upper surface of the ram cylinder 11, so that these bars ride up carrying with them the pinplate 72, whereby the knockout pins 81 integral therewith, knock the molded article 82 from the chase.

I refer now to Figs. 7 and 8 for comparison of a conventional molding procedure with that of the present invention. In the conventional molding procedure of Fig. 7, the mold halves 91, 92 are clamped together between a fixed support 93 and a hydraulic ram platen 94, the mold being thus completely closed to provide a mold cavity 95 corresponding in dimensions and configuration to that of the finished article to be molded, in this instance a panel-like article, relatively wide in lateral dimension relative to its thickness. The plasticized material is extruded from the plasticizing chamber through the injection orifice 96, extending through the supporting member 93 and upper mold half 91, as shown. As the plastic material enters the mold cavity, it is forced outwardly in the mold cavity somewhat as indicated at 97, 98. Meanwhile, it immediately commences to chill and harden in the mold, the extreme portions 99, 100, chilling and hardening most rapidly, since these portions must be displaced furthest from the injection nozzle to the mold cavity extremities 101, 102, while always remaining the foremost portions of the injected plastic charge, to encounter the heat-dissipating metal surfaces of the mold. By reason of the relatively rapid chilling and hardening of the plastic boundary portions 99, 100, combined with the relatively small height of the mold cavity, the relatively hotter and more plastic entering portions 103 of the charge cannot break through the boundary portions 99, 100, to flow to the mold extremities 101, 102. As a consequence, an extremely high injection pressure of the order of 16,000 to 20,000 p. s. i. is required to force the plastic charge to the mold extremities. This high injection pressure in turn exerts a correspondingly high, hydrostatic pressure between the mold halves, tending to force them apart. As a result, a high clamping pressure of the order of 6,000 p. s. i. must be continuously exerted between the ram platen 94 and the stationary support 93, to prevent extrusion of the plastic charge through the juncture 104 between the mold halves in the form of a "flash."

Consider now, by way of comparison, the action occurring in the molding procedure of Fig. 8. In this instance a closed type mold is employed which includes a lower or base member 105, embodying a mold cavity 106, terminating in upstanding sidewalls, as at 107, having internal wall portions, as at 108, substantially perpendicular to the base 109 of the cavity member. The mold also includes an upper, closure member, or force plug 110, insertable in the mold cavity 106, and having vertical wall portions 111, adapted slidably to engage the vertical wall portion 108 of the mold cavity 106, in a snug fit, piston-like fashion.

During extrusion of the plastic charge from the plasticizing chamber 112 through the orifice member 113 into the mold cavity, the force plug 110 is maintained only slightly inserted in the cavity member 105, as shown, by the auxiliary rams 114, interposed between the ram platen 116 and the bolster plate 117. In consequence, the height and volume of the mold cavity is considerably in excess of that required for molding the finished article, the latter as indicated by the dotted line 118. In consequence, as the plastic material 119 is extruded into the mold, it at first tends to spread out in one big gob in the manner indicated at 120, 121, but ultimately the relatively hot entering material at 122 breaks through the extremities of the gob-like portion 120, 121, in the manner indicated at 123, 124, whereby the hottest and most plastic portions of the entering charge are forced to the mold extremities 125, 126. This action occurs by reason of the height of the mold cavity during the extrusion cycle, since the mold cavity is but partially closed. Since the injected charge occupies considerably less volume than the mold cavity at this stage, and since the hottest material flows to the mold extremities, relatively little injection pressure, of the order of but 3,000 p. s. i., is required to inject the charge.

For these same reasons, practically no pressure is exerted between the mold halves at this stage, in addition to which, any heated gas pressure developing escapes through the slots 127 in the cavity member.

When now the force plug is forced into the mold cavity to the full extent indicated by the dotted line 118, to mold the finished article, very little clamping pressure, of the order of only about 2,000 p. s. i., is required between the ram platen 116 and the bolster plate 117, because the plastic charged is spread out over the base of the mold cavity with the hottest material at the extremities, so that it is easily molded to final shape under very little pressure, the excess charge exuding through slots 127 in the cavity member walls. And owing to the closed type mold employed, in which the closure member 110 enters the cavity member 105 in piston-like fashion, the molded article is cut off around the periphery so that no flash occurs.

I claim:

1. Apparatus for injection molding thermally plasticizable materials, comprising: a press including a power-actuated and displaceable ram, a ram-platen integral therewith, and a stationary press head spaced therefrom; a bolster plate displaceably mounted with respect to said press head; a mold including a chase mounted on said platen, and a force plug mounted on said bolster plate; injection means including a plasticizing chamber mounted on said bolster plate, and an injection plunger therefor, mounted on said press head; upstanding, yieldable, force-resisting elements having their lower ends mounted on said platen and their upper ends adapted to engage said bolster plate upon elevation of said platen; said bolster plate being normally so positioned as to maintain said force-resisting elements spaced therefrom, and to maintain said force plug spaced from said chase, and said injection plunger spaced from said plasticizing chamber; means for displacing said ram and platen, thereby to displace said chase toward said force plug until the latter slightly enters the chase; said force-resisting elements thereupon engaging said bolster plate and displacing the same concurrently with said platen, thereby to prevent further entry of said force plug into said chase, while causing said plunger to enter said plasticizing chamber, to inject a charge of plasticizable material into the mold cavity formed between the force plug and chase; means responsive to further displacement of said ram and platen for arresting further displacement of said plasticizing chamber and bolster plate, said force-resisting elements thereupon yielding to permit said force plug to enter said chase to the full depth required, to mold the plasticized material injected into the mold cavity.

2. Apparatus for injection molding thermally plasticible materials, comprising: a press including a power-actuated and elevatable ram, a ram platen integral therewith, and a stationary press head spaced therefrom and disposed thereabove; tie rods suspended from said presshead, a bolster plate displaceably supported on and by said tie rods; helical compression springs encircling said tie rods between said press head and bolster plate; a mold including a chase mounted on said platen, and a force plug therefor, supported from said bolster plate; injection means including a plasticizing chamber mounted on said bolster plate, and an injection plunger therefor, mounted on said press head; yieldable, upstanding force-resisting elements mounted having the lower ends of each on said platen and the upper end thereof adapted to engage said bolster plate upon elevation of said platen; said bolster plate being normally so positioned as to maintain said force-resisting elements spaced therefrom, and to maintain said force plug spaced from said chase, and said injection plunger spaced from said plasticizing chamber; means for elevating said ram and platen, thereby to elevate said chase toward said force plug until the latter slightly enters the chase, said force-resisting elements thereupon engaging said bolster plate and elevating the same concurrently with said platen, thereby to prevent further entry of said force plug into said chase while causing said injection plunger to enter said plasticizing chamber, to inject a charge of plasticizable material into the mold cavity formed between the force plug and chase; means responsive to further elevation of said ram and platen for arresting further elevation of said plasticizing chamber and bolster plate, said force-resisting elements thereupon yielding to permit said force plug to enter said chase to the full depth required to mold the plasticized material injected into the mold cavity.

3. Apparatus for injection molding thermally plasticizable materials, comprising: a press including a power-actuated and elevatable main ram, a ram platen integral therewith, and a stationary press head spaced therefrom and disposed thereabove; a bolster plate displaceably supported from said press head; means interposed between said press head and bolster plate for resiliently maintaining said bolster plate spaced from said press head; a mold including a chase mounted on said platen, and a force plug therefor, supported from said bolster plate; injection means including a plasticizing chamber mounted on said bolster plate, and an injection plunger therefor, mounted on said press head; a plurality of auxiliary hydraulic ram means, each including a cylinder and a piston displaceable therein, means mounting said cylinders on said platen in upstanding position such that the pistons thereof are adapted to engage said bolster plate upon elevation of said platen; means for supplying fluid under a preselected hydraulic pressure to said auxiliary rams; said bolster plate being normally so positioned as to maintain said auxiliary ram pistons spaced therefrom, and to maintain said force plug spaced from said chase, and said injection plunger spaced from said plasticizing chamber; means for elevating said main ram and platen, thereby to elevate said chase toward said force plug until the latter slightly enters the chase, said auxiliary ram pistons thereupon engaging said bolster plate and elevating the same concurrently with said platen, thereby to prevent further entry of said force plug into said chase, while causing said injection plunger to enter said plasticizing chamber, to inject a charge of plasticizable material into the mold cavity formed between the force plug and chase; means responsive to further elevation of said main ram and platen for arresting further elevation of said plasticizing chamber and bolster plate, said auxiliary ram pistons being thereupon depressed into their respective hydraulic cylinders against said hydraulic pressure applied thereto, thereby to permit said force plug to enter said chase to the full depth required to mold the plasticized material injected into the mold cavity into the configuration of the opposed surfaces of the chase and force plug.

4. Apparatus for injection molding thermally plasticizable material, comprising: a press including a power actuated and elevatable main ram, a ram platen integral therewith, and a stationary press head spaced therefrom and disposed thereabove; a bolster plate displaceably supported from said press head; means interposed between said press head and bolster plate for resiliently maintaining said bolster plate spaced from said press head; a mold including a chase mounted on said platen, and a force plug therefor, supported on said bolster plate; injection means including a plasticizing chamber mounted on said bolster plate, and an injection plunger therefor, mounted on said press head; a plurality of auxiliary hydraulic ram means, each including a pair of elements comprising a cylinder and a piston displaceable therein, means mounting a first said element of each pair on said platen in upstanding position such that the second element of said pair is adapted to engage said bolster plate upon elevation of said platen; means for supplying fluid under a preselected hydraulic pressure to said auxiliary rams; said bolster plate being normally so positioned as to maintain said auxiliary ram elements spaced therefrom, and to maintain said force plug spaced from said chase, and said injection plunger spaced from said plasticizing chamber; means for elevating said main ram and platen, thereby to elevate said chase toward said force plug until the latter slightly enters the chase, said auxiliary ram elements thereupon engaging said bolster plate and elevating the same concurrently with said platen, thereby to prevent further entry of said force plug into said chase, while causing said injection plunger to enter said plasticizing chamber, to inject a charge of plasticizable material into the mold cavity formed between the force plug and chase; means responsive to further elevation of said main ram and platen for arresting further elevation of said plasticizing chamber and bolster plate, the second said elements of said auxiliary rams being thereupon depressed with respect to the first said elements thereof against said hydraulic pressure applied to said auxiliary rams, thereby to permit said force plug to enter said chase to the full depth required to mold the plasticized material injected into the mold cavity, into the configuration of the opposed surfaces of the chase and force plug.

LOUIS F. KUTIK.

REFERENCES CITED

The following references are of record in the file of this patent:

UNITED STATES PATENTS

| Number | Name | Date |
|---|---|---|
| 1,919,534 | Shaw | July 25, 1933 |
| 1,997,074 | Novotny | Apr. 9, 1935 |
| 2,277,599 | McGinnis | Mar. 24, 1942 |
| 2,296,296 | Shaw | Sept. 22, 1942 |
| 2,332,679 | Tucker | Oct. 26, 1943 |
| 2,423,914 | Wacker | July 15, 1947 |
| 2,443,826 | Johnson | June 22, 1948 |
| 2,463,401 | Lyons | Mar. 1, 1949 |